United States Patent Office 2,699,399
Patented Jan. 11, 1955

2,699,399

GREEN OPHTHALMIC GLASS

William H. Armistead, Corning, N. Y., assignor to Corning Glass Works, Corning, N. Y., a corporation of New York No Drawing. Application February 18, 1952,
Serial No. 272,244

11 Claims. (Cl. 106—53)

This invention relates generally to green glasses and is particularly concerned with imparting a greenish color to lead-containing glasses such as the flint glasses used for the high-index segments of multifocal ophthalmic lenses.

Green eye-protecting spectacles or "sun glasses" are commonly composed of green spectacle crown glass, the green coloration of which is produced by a mixture of FeO and $Fe_2O_3$ resulting from introducing into its batch an iron oxide and melting the batch under reducing conditions. The color of such glass has become standardized and the glass is conventionally produced in four different shades (2 mm. thickness) designated A, B, C and D and ranging in color saturation from light to dark green respectively (National Bureau of Standards Circular No. 471 issued October 8, 1948). Green spectacle crown glass is normally softer than standard white optical crown glass, however, because, with the introduction of iron oxide thereinto, it is necessary to decrease the normal CaO content of the base glass in order to maintain the desired refractive index, thereby substantially lowering the softening point.

When green spectacle crown glass is utilized for making multifocal ophthalmic lenses, it is desirable that the high-index segments thereof be composed of a flint glass because, generally speaking, flint glasses not only have the requisite high refractive indices but also have the desirably lower softening points which are necessary in order to avoid distortion of the crown glass when the former are sealed thereto. For such use it is also desirable that the flint glass have a color exactly or substantially exactly matching that of the green spectacle crown. So far as applicant is aware, however, the production of the desired color in a flint glass has not heretofore been accomplished. Attempts to color a flint glass with FeO, for example, have been unsuccessful because melting of glasses containing substantial amounts of PbO (3% or more) under the reducing conditions necessary to produce the iron oxide greenish tint results in the reduction of the PbO to metallic lead and in an undesirable discoloration of the glass thereby.

I have now discovered that ophthalmic flint glasses in particular can be colored, without resort to reducing agents, to a suitably close match for green spectacle crown glass by including in their batches a mixture of the oxides of antimony, chromium, nickel and cobalt in certain proportions, together with an oxidizing agent such as an alkali metal nitrate. Moreover, the present discovery is also applicable to the production of a greenish color in silicate glasses in general.

While substantially any oxidized silicate glass may be so colored, the practical range of compositions encompassed by this invention comprises essentially 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, at least one bivalent metal oxide in the indicated proportion selected from the group consisting of up to 5% BeO, up to 10% MgO, up to 15% CaO, up to 15% ZnO, up to 15% SrO, up to 15% CdO, up to 35% BaO, and up to 60% PbO, the selected bivalent metal oxide including an oxide selected from the group consisting of CaO, ZnO, BaO and PbO, the total of the bivalent metal oxides being 15 to 60%, 0.1 to 20% $Sb_2O_3$, 0.02 to 0.8% $Cr_2O_3$, 0.01 to 0.25% NiO and 0.001 to 0.025% CoO, the total of the essential constituents being at least 75%.

Each of the four oxides $Sb_2O_3$, $Cr_2O_3$, NiO and CoO is essential for the production of the desired color and must be present in the glass in the above proportions. $Sb_2O_3$ per se does not color glass and amounts exceeding 1% have no additional effect on the color of the present glasses although amounts up to 20% may, if desired, be utilized as an additional glass-making oxide. To produce the desired hues, the amount of $Cr_2O_3$ should be from 1.5 to 5 times the amount of NiO and the amount of NiO should be from 3 to 20 times the amount of CoO.

Other metal oxides which may be present in limited amounts in the glasses of this invention include $B_2O_3$ in amounts up to 8%, but preferably not over 5%, $Al_2O_3$ in amounts up to 5%, $TiO_2$ in amounts up to 12%, and $ZrO_2$ in amounts up to 15% except in lead glasses free of other bivalent metal oxides in which case not more than about 7% of $ZrO_2$ will dissolve in the glass. Such optional metal oxides should not total more than 25%.

The following glass compositions calculated from their respective batches to the oxide basis in parts by weight will illustrate the invention. (The amounts of the coloring oxides $Cr_2O_3$, NiO and CoO, being less than one, are necessarily expressed in three to four significant places; but such practice is without significance in expressing the major constituents. Since each composition totals approximately 100 the amounts given for the various constituents thereof can for practical purposes be called per cent by weight.)

|  | 1 | 2 | 3 | 4 | 5 | 6 | 7 | 8 | 9 |
|---|---|---|---|---|---|---|---|---|---|
| $SiO_2$ | 50.1 | 37.8 | 37.6 | 45.7 | 41.1 | 45.3 | 39.2 | 45.8 | 39.4 |
| $K_2O$ | 5.2 | | 4 | 6.5 | 4.5 | 4.4 | | | |
| $Na_2O$ | 5 | 7.6 | 1.8 | 2.1 | 2 | 5.5 | 7.9 | 6.5 | 6.5 |
| $Li_2O$ | | | | | | | | 2 | |
| CaO | | | | | | | 5 | 5 | 5 |
| ZnO | | | | | | | | 7.1 | 7.5 |
| BaO | | 15 | | | | | 20 | 20 | 19.5 |
| PbO | 37.7 | 30 | 52.3 | 44.8 | 42.4 | 39.8 | 14 | | |
| $B_2O_3$ | | 4 | | | | | 3.5 | 4 | 5 |
| $Al_2O_3$ | 2 | | 0.2 | 0.4 | | 2 | | | |
| $TiO_2$ | | | 3.8 | | | | 3 | 2.2 | 8.9 |
| $ZrO_2$ | | 5.2 | | | 10 | 3 | 7.3 | 7 | 7 |
| $Sb_2O_3$ | 0.4 | 0.5 | 0.3 | 0.6 | 10 | 0.2 | 0.5 | 0.8 | 1 |
| $Cr_2O_3$ | 0.176 | 0.14 | 0.057 | 0.41 | 0.14 | 0.10 | 0.09 | 0.05 | 0.25 |
| NiO | 0.0425 | 0.08 | 0.03 | 0.11 | 0.07 | 0.024 | 0.05 | 0.028 | 0.145 |
| CoO | 0.0025 | 0.008 | 0.010 | 0.011 | 0.010 | 0.0014 | 0.005 | 0.0028 | 0.015 |
| Refractive index, $n_D$ | 1.588 | 1.653 | 1.700 | 1.616 | 1.653 | 1.616 | 1.653 | 1.616 | 1.664 |
| Softening point, °C | 626 | 633 | 593 | 619 | 600 | 632 | 686 | 664 | 731 |
| Color (Shade) | B | C | B | D | C | A | B | A | D |

The above glasses are melted under oxidizing conditions by including in their batches an alkali metal nitrate. The colors of the resulting glasses are similar in appearance to the colors produced by a mixture of FeO and $Fe_2O_3$ in green crown glasses melted under reducing conditions. The glasses of examples 1 to 7 are flints, examples 2 and 7 being barium flints. The glasses of examples 1 to 4 are particularly suitable in color, softening point and refractive index for combination as bifocal buttons with green spectacle crown glasses. While the invention is especially adapted for the production of such green-colored lead-containing ophthalmic glasses, it may also advantageously be utilized for the green coloration of silicate glasses in general, such as, the non-lead glasses of examples 8 and 9.

Variations in the proportions of the essential coloring constituents of the glasses of this invention should be confined within the limits set forth above for the following reasons:

From the standpoint of coloration $Sb_2O_3$ functions to make the color due to $Cr_2O_3$ more green or less yellow by increasing the transmission of blue wave lengths thereby. A deficiency of $Sb_2O_3$ therefore results in the color of the glass being too yellowish. More than 20% $Sb_2O_3$ results in an objectionable tendency of the glass to devitrify.

From this it follows that an excess of $Cr_2O_3$ will increase the green transmission or brighten the green appearance of the glass too much. On the other hand, a deficiency of $Cr_2O_3$ will cause the color of the glass to tend too much towards gray.

In combination the NiO and CoO provide a neutral or gray tint for the purpose of dulling or reducing the brightness of the green color due to $Cr_2O_3$. Too much NiO or too little CoO will make the color too yellow while too much CoO or too little NiO will make the color too blue. With the NiO and CoO in the proper ratio an excess of both will cause the glass to appear too gray but a deficiency of both will cause the green color of the glass to appear too bright.

It is characteristic of the present glasses that, when the percentage of each of the oxides, $Sb_2O_3$, $Cr_2O_3$, NiO and CoO which produces the desired hue has once been determined, any desired shade may thereafter be obtained by merely varying the percentages of $Cr_2O_3$, NiO and CoO without changing their respective ratios with one another.

The remaining essential constituents of the present glasses have no substantial effect upon their color, but other physical and chemical properties of the glass are affected thereby as follows:

The softening point is objectionably increased by an excess of either $SiO_2$, BeO, or CaO and is decreased by an excess of the alkali metal oxides. The acid durability of the glass becomes undesirably low with a deficiency of $SiO_2$ or an excess of alkali metal oxide, MgO, SrO, CdO, or PbO. Devitrification of the glass results from an excess of MgO, CaO, ZnO, or BaO. The maintenance of the desired refractive index requires that the total bivalent metal oxides be between 15 and 60%.

Of the non-essential constituents, $Al_2O_3$ in excessive amounts causes an objectionable increase in the softening point of the glass and an undesirable decrease in its acid durability. An excess of $B_2O_3$ also lowers the acid durability, while an excess of $ZrO_2$ or $TiO_2$ increases the tendency for the glass to devitrify.

As used herein, the softening point of a glass is that temperature at which the glass has a viscosity in the neighborhood of $4.5 \times 10^7$ poises.

What is claimed is:

1. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, at least one bivalent metal oxide in the indicated proportion selected from the group consisting of up to 5% BeO, up to 10% MgO, up to 15% CaO, up to 15% ZnO, up to 15% SrO, up to 15% CdO, up to 35% BaO and up to 60% PbO, the selected bivalent metal oxide including an oxide selected from the group consisting of CaO, ZnO, BaO and PbO, the total of the bivalent metal oxides being 15 to 60%, 0.1 to 20% $Sb_2O_3$, 0.02 to 0.8% $Cr_2O_3$, 0.01 to 0.25% NiO and 0.001 to 0.025% CoO, the ratio $Cr_2O_3$/NiO being from 1.5/1 to 5/1 and the ratio NiO/CoO being from 3/1 to 20/1, the total of the essential constituents being at least 75%.

2. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, 15 to 60% PbO, 0.1 to 20% $Sb_2O_3$, 0.02 to 0.8% $Cr_2O_3$, 0.01 to 0.25% NiO and 0.001 to 0.025% CoO, the ratio $Cr_2O_3$/NiO being from 1.5/1 to 5/1 and the ratio NiO/CoO being from 3/1 to 20/1, the total of the essential constituents being at least 75%.

3. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, up to 35% BaO, up to 60% PbO, the total BaO and PbO being 15 to 60%, 0.1 to 20% $Sb_2O_3$, 0.02 to 0.8% $Cr_2O_3$, 0.01 to 0.25% NiO and 0.001 to 0.025% CoO, the ratio $Cr_2O_3$/NiO being from 1.5/1 to 5/1 and the ratio NiO/CoO being from 3/1 to 20/1, the total of the essential constituents being at least 75%.

4. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, 15 to 60% PbO, 0.1 to 20% $Sb_2O_3$, 0.02 to 0.8% $Cr_2O_3$, 0.01 to 0.25% NiO, 0.001 to 0.025% CoO, the ratio $Cr_2O_3$/NiO being from 1.5/1 to 5/1 and the ratio NiO/CoO being from 3/1 to 20/1, the total of the essential constituents being at least 75%, and up to 5% $Al_2O_3$.

5. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, 15 to 60% PbO, 0.1 to 20% $Sb_2O_3$, 0.02 to 0.8% $Cr_2O_3$, 0.01 to 0.25% NiO, 0.001 to 0.025% CoO, the ratio $Cr_2O_3$/NiO being from 1.5/1 to 5/1 and the ratio NiO/CoO being from 3/1 to 20/1, the total of the essential constituents being at least 75%, and up to 12% $TiO_2$.

6. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, 15 to 60% PbO, 0.1 to 20% $Sb_2O_3$, 0.02 to 0.8% $Cr_2O_3$, 0.01 to 0.25% NiO, 0.001 to 0.025% CoO, the ratio $Cr_2O_3$/NiO being from 1.5/1 to 5/1 and the ratio NiO/CoO being from 3/1 to 20/1, the total of the essential constituents being at least 75%, and up to 7% $ZrO_2$.

7. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, up to 35% BaO, up to 60% PbO, the total BaO and PbO being 15 to 60%, 0.1 to 20% $Sb_2O_3$, 0.02 to 0.8% $Cr_2O_3$, 0.01 to 0.25% NiO, 0.001 to 0.025% CoO, the ratio $Cr_2O_3$/NiO being from 1.5/1 to 5/1 and the ratio NiO/CoO being from 3/1 to 20/1, the total of the essential constituents being at least 75%, and up to 8% $B_2O_3$.

8. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, up to 35% BaO, up to 60% PbO, the total BaO and PbO being 15 to 60%, 0.1 to 20% $Sb_2O_3$, 0.02 to 0.8% $Cr_2O_3$, 0.01 to 0.25% NiO, 0.001 to 0.025% CoO, the ratio $Cr_2O_3$/NiO being from 1.5/1 to 5/1 and ratio NiO/CoO being from 3/1 to 20/1, the total of the essential constituents being at least 75%, and up to 12% $TiO_2$.

9. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, up to 35% BaO, up to 60% PbO, the total BaO and PbO being 15 to 60%, 0.1 to 20% $Sb_2O_3$, 0.02 to 0.8% $Cr_2O_3$, 0.01 to 0.25% NiO, 0.001 to 0.025% CoO, the ratio $Cr_2O_3/NiO$ being from 1.5/1 to 5/1 and the ratio NiO/CoO being from 3/1 to 20/1, the total of the essential constituents being at least 75%, and up to 15% $ZrO_2$.

10. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, 15 to 60% PbO, 0.1 to 20% $Sb_2O_3$, 0.02 to 0.8% $Cr_2O_3$, 0.01 to 0.25% NiO, 0.001 to 0.025% CoO, the ratio $Cr_2O_3/NiO$ being from 1.5/1 to 5/1 and the ratio NiO/CoO being from 3/1 to 20/1, the total of the essential constituents being at least 75%, and up to 8% $B_2O_3$.

11. A glass composition comprising essentially by weight 33 to 55% $SiO_2$, at least one alkali metal oxide in the indicated proportion selected from the group consisting of up to 12% $K_2O$, up to 15% $Na_2O$ and up to 4% $Li_2O$, the selected alkali metal oxide including an oxide selected from the group consisting of $K_2O$ and $Na_2O$, the total of the alkali metal oxides being 5 to 15%, up to 35% BaO, up to 60% PbO, the total BaO and PbO being 15 to 60%, 0.1 to 20% $Sb_2O_3$, 0.02 to 0.8% $Cr_2O_3$, 0.01 to 0.25% NiO, 0.001 to 0.025% CoO, the ratio $Cr_2O_3/NiO$ being from 1.5/1 to 5/1 and the ratio NiO/CoO being from 3/1 to 20/1, the total of the essential constituents being at least 75%, and up to 5% $Al_2O_3$.

References Cited in the file of this patent

UNITED STATES PATENTS 2,523,266    Armistead _____ Sept. 26, 1950

OTHER REFERENCES

"Rx Lenses," American Optical Company Catalog, page 64, published in 1950.